US005612136A

United States Patent [19]

Everaerts et al.

[11] Patent Number: 5,612,136
[45] Date of Patent: Mar. 18, 1997

[54] PRESSURE-SENSITIVE ADHESIVES HAVING IMPROVED ADHESION TO ACID-RAIN RESISTANT AUTOMOTIVE PAINTS

[75] Inventors: Albert I. Everaerts, Oakdale, Minn.; Satoshi Takeda, Sagamihara, Japan; Peter A. Stark, Cottage Grove, Minn.

[73] Assignee: Minnesota Mining and Manufacturing Company, St. Paul, Minn.

[21] Appl. No.: 319,246

[22] Filed: Oct. 6, 1994

Related U.S. Application Data

[63] Continuation of Ser. No. 33,174, Mar. 16, 1993, abandoned.

[51] Int. Cl.$^6$ ........................................................ C09J 7/02
[52] U.S. Cl. .................................. 428/355 AK; 428/518; 428/520; 525/218
[58] Field of Search ........................ 428/343, 355, 428/518, 520; 525/218

[56] References Cited

U.S. PATENT DOCUMENTS

| | | | |
|---|---|---|---|
| Re. 24,906 | 12/1960 | Ulrich | 206/59 |
| 4,172,934 | 10/1979 | Heilmann | 526/298 |
| 4,223,067 | 9/1980 | Levens | 428/308 |
| 4,239,384 | 5/1982 | Vesley et al. | 428/40 |
| 4,330,590 | 5/1982 | Vesley | 428/336 |
| 4,364,972 | 12/1982 | Moon | 427/54.1 |
| 4,379,201 | 4/1983 | Heilmann et al. | 428/345 |
| 4,415,615 | 11/1983 | Esmay et al. | 428/40 |
| 4,619,979 | 10/1986 | Kotnour et al. | 526/88 |
| 4,732,790 | 3/1988 | Blackburn et al. | 427/407.1 |
| 4,737,559 | 4/1988 | Kellen et al. | 526/291 |
| 4,843,134 | 6/1989 | Kotnour et al. | 526/318.4 |
| 4,902,569 | 2/1990 | Chen | 428/344 |
| 4,943,461 | 7/1990 | Karim | 428/40 |
| 4,946,742 | 8/1990 | Landin | 428/354 |
| 4,985,488 | 1/1991 | Landin | 524/555 |
| 5,019,377 | 5/1991 | Torgerson | 424/70 |
| 5,137,972 | 8/1992 | Cook | 525/123 |
| 5,196,266 | 3/1993 | Lu | 428/343 |
| 5,334,447 | 8/1994 | Kitamura et al. | 427/317.3 |
| 5,334,686 | 8/1994 | Ando et al. | 526/307.7 |

FOREIGN PATENT DOCUMENTS

| | | |
|---|---|---|
| 0342811A2 | 11/1989 | European Pat. Off. . |
| 0409301 | 1/1991 | European Pat. Off. ........ C08G 18/32 |
| 0450963 | 10/1991 | European Pat. Off. ........ C08L 35/02 |
| 5-140523 | 12/1991 | Japan ...................... 133/10 |
| 5-263055 | 5/1992 | Japan ...................... 133/6 |
| 6166857 | 11/1992 | Japan . |
| [1994]166858 | 11/1992 | Japan . |
| [1994]172720 | 12/1992 | Japan . |
| [1994]200225 | 12/1992 | Japan . |
| 6172729 | 12/1992 | Japan . |
| 5-105857 | 4/1993 | Japan ...................... 133/10 |
| 1166682 | 9/1966 | United Kingdom . |
| WO92/05225 | 4/1992 | WIPO ........................ C09D 133/10 |

OTHER PUBLICATIONS

*Journal of Applied Polymer Science*, vol. 27, D. R. Bauer, Degradation of Organic Coatings. I. Hydrolysis of Melamine Formaldehyde/Acrylic Copolymer Films, pp. 3651–3662, 1982.

*Rubber Chemistry & Technology*, 57(2), Frederick M. Fowkes, Acid–Base Contributions To Polymer–Filler Interactions, pp. 328–343, 1984.

*Primary Examiner*—Jenna Davis
*Attorney, Agent, or Firm*—Gary L. Griswold; Walter N. Kirn; Janice L. Dowdall

[57] ABSTRACT

The present invention provides a pressure-sensitive adhesive composition and tape prepared therefrom which has excellent ability to adhere to acidic surfaces such as acid-rain resistant automotive paints. The adhesive comprises a crosslinked copolymer comprising certain (meth)acrylate esters, certain nitrogen containing basic monomers copolymerizable therewith, optional copolymerizable acidic monomer, and crosslinker.

20 Claims, No Drawings

PRESSURE-SENSITIVE ADHESIVES HAVING IMPROVED ADHESION TO ACID-RAIN RESISTANT AUTOMOTIVE PAINTS

This is a continuation of application Ser. No. 08/033,174 filed Mar. 16, 1993, now abandoned.

FIELD OF THE INVENTION

The present invention relates to a pressure-sensitive adhesive and a pressure-sensitive adhesive tape prepared therefrom which shows excellent adhesion to solid acidic surfaces such as acidic non-melamine crosslinked, acid-rain resistant automotive paints.

BACKGROUND OF THE INVENTION

Automobile body side molding and emblems are usually permanently mounted to exterior automobile surfaces either by mechanical fasteners or by pressure-sensitive adhesive tapes having a foamlike or foam core and relatively thin pressure-sensitive adhesive top layers or coatings. These exterior mounting tapes must not only strongly adhere to the protective and decorative automotive coatings and finishes, but must also withstand the environmental and mechanical stresses encountered by automobiles.

Typical foam and foamlike cores include filled or unfilled commercially available crosslinked polyethylene, polyurethane, polychloroprene, or acrylate foams. Acrylic copolymers, due to in part to their ease of formulation and weathering stability, are commonly the pressure-sensitive adhesives coated on such cores. These acrylic pressure-sensitive adhesives (PSAs) generally comprise a primary component of acrylate or methacrylate monomer or a combination of such monomers which, when polymerized, have a low glass transition temperature (Tg). These soft, tacky low Tg monomers are copolymerized with a secondary component consisting of high Tg monomers, usually polar monomers such as acrylic acid, methacrylic acid, itaconic acid, acrylamide, methacrylamide, and mixtures thereof. As described in Re U.S. Pat. No. 24,906 (Ulrich, assigned to 3M Company), when such polar monomers are incorporated with a predominance of low Tg monomers, a sufficiently tacky pressure-sensitive adhesive is formed having high cohesive or internal strength. Further increases in internal or cohesive strength (i.e., shear strength), which are often required to resist the severe environmental and chemical conditions found in automotive applications, can be obtained through crosslinking the acrylate PSAs.

These acrylate PSAs, most importantly, must adhere well to the high solids coatings employed by automotive manufacturers and suppliers. These coatings, formulated for appearance and hardness, are often acrylate or methacrylate copolymers containing hydroxy functional monomers which are subsequently crosslinked through the hydroxy functionalities in an acid catalyzed reaction using melamine curing agents. Due to the high melamine concentration of such coatings, they tend to have a basic character which enhances the adhesion of acrylate pressure-sensitive adhesives currently provided by automotive industry suppliers.

The acrylic-melamine crosslinked automotive coating formulations currently in use, while possessing the required toughness, appearance, and resistance to weathering, are subject to a new and problematic form of environmental degradation. Chemical attack of these coatings by acid-rain in industrialized regions causes undesirable, costly and often irreparable etching of such surfaces. As described by D. R. Bauer in an article entitled "Degradation of Organic Coatings. I. Hydrolysis of Melamine Formaldehyde/Acrylic Copolymer Films [*Journal of Applied Polymer Science*, 27(10), 3651–3662]," this coating degradation results from the irreversible acidolysis of the acrylic-melamine crosslinks and the formation of brittle melamine-melamine linkages.

In response to the problems resulting from acid-rain damage, new coating formulations having reduced or eliminated melamine curing agents have been developed. For example, European Patent Application 409,301 (Garden et al., assigned to Akzo N.V.) describes a high solids, high performance, urethane-linked automotive coating having enhanced acid etch resistance which comprises a particular polyurethane polyol and a hydroxyl groups-reactive crosslinking agent. In addition to the preferred aminoplast (i.e., melamine) crosslinkers, which could lead to the same acid susceptibility discussed above, Garden et at. also specify the use of polyisocyanate or blocked polyisocyanate crosslinking agents.

U.S. Pat. No. 5,137,972 (Cook, assigned to BASF) describes a two-component environmental etch resistant top coating comprising in one component at least one blocked isocyanate crosslinker and the second component a film forming polymer having a functionality which is reactive with the first crosslinking component. Cook, however, still allows for melamines as additional ingredients.

World Patent Appl. 92/05225 (Hazan et al., assigned to duPont) describes an automotive clear coating composition which is particularly resistant to etching caused by acid-rain. This composition, comprising a binder and liquid carrier, contains a binder comprising an acrylosilane polymer, an acrylic polyol polymer and an alkylated melamine formaldehyde crosslinking agent.

European Patent Application 450,963 (Okude et al., assigned to Nippon Paint Co.) describes a weather resistant automotive topcoating which eliminates the need for melamine-based curing agents and, unlike urethane-linked coatings, does not require toxic isocyanate starting materials. This ester-linked composition comprises a compound having both an epoxy and a hydroxy group combined with a copolymer prepared from a radically polymerizable monomer having an acid anhydride group (e.g., itaconic anhydride, maleic anhydride, citraconic anhydride, and the like) and a copolymerizable monomer. When the anhydride acid groups are substantially completely half esterified on such compounds, epoxy-acid linkages are formed, linkages which resist the degradation which cleaves current melamine-cured coatings when they are exposed to acid-rain.

Similarly, U.S. Pat. No. 4,732,790 (Blackburn et al., assigned to PPG Industries) describes a high solids automotive top coating composition comprising a low number average molecular weight polyepoxide, an anhydride curing agent, an onium salt curing catalyst. Such coatings, according to the inventors, exhibit high levels of solvent resistance, gloss, hardness and sag resistance, attributes typically and previously found only in high solids coatings using melamine curing agents.

Such ester-linked compositions, however, do not possess the same basic character as melamine-cured coatings. Thus, the acrylate pressure-sensitive adhesives currently in use do not adhere as well to these newer, less alkaline (i.e., slightly acidic) acid-rain resistant automotive coating compositions.

U.S. Pat. No. 4,943,461, (Karim, assigned to 3M Company), discloses a photopolymerized pressure-sensitive adhesive with outstanding ability to bond to polyvinylchloride (PVC). The adhesive comprises a copolymer of an alkylacrylate and a polar nitrogen containing vinyl monomer to which is added an acrylonitrile butadiene rubber. The adhesive is specifically designed for PVC applications and no reference is made to adhesion to automotive paints.

U.S. Pat. No. 4,946,742 (Landin, assigned to 3M Company), discloses normally tacky and pressure-sensitive adhesives having excellent long-term adhesion to plasticized vinyl surfaces, prepared from a representative blend of dioctyl phthalate plasticizer and a terpolymer of an alkyl acrylate, a nitrogen containing vinyl monomer and a vinyl carboxylic acid. The adhesive is designed for plasticized surfaces.

U.S. Pat. No. 4,364,972 (Moon, assigned to 3M Company) discloses a pressure-sensitive adhesive which adheres strongly to automotive paints. This adhesive consists essentially of the photopolymerized reaction product of an acrylic acid ester of a non-tertiary alcohol, the alkyl groups of which have an average of 4–14 carbon atoms, and N-vinyl-2-pyrrolidone in an amount within 15–50 parts by weight of the total monomers. According to Moon, if other modifying copolymerizable monomers are added to this pressure-sensitive adhesive composition, such as acrylic acid, acrylonitrile and N-substituted acrylamides, then a loss in "quick-stick" or tack of the adhesive would result.

U.S. Pat. No. 5,019,377 (assigned to Proctor and Gamble) discloses low glass transition adhesive compositions of an acrylic or methacrylic ester copolymer with acrylamides or methacrylamides. The adhesives are useful for hairstyling products, but do not have good pressure-sensitive adhesive properties. The acrylamide and methacrylamide monomers impart hydrophilicity to the formulation.

SUMMARY OF THE INVENTION

Thus, a need exists for a pressure-sensitive adhesive and a pressure-sensitive adhesive tape prepared therefrom which adheres with sufficient peel strength and shear strength to acid-rain resistant automobile coatings having acidic character.

We have discovered a pressure-sensitive adhesive composition which exhibits significantly improved adhesion to these acid-rain resistant paints.

The present invention relates to a normally tacky and pressure-sensitive adhesive having outstanding ability to bond to solid acidic surfaces such as acidic acid-rain resistant automotive paints and to remain firmly bonded thereto.

The adhesive comprises:

a crosslinked copolymer of 100 parts by weight monomer of elements (a), (b), and (c) wherein the copolymer comprises (a) about 60 to about 90 parts by weight of at least one monomer selected from the group consisting of monofunctional unsaturated (meth)acrylate esters of non-tertiary alkyl alcohols, and mixtures thereof, the alkyl groups of which comprise from about 4 to about 12 carbon atoms which as homopolymers have glass transition temperatures below about $-20°$ C.;

(b) correspondingly, about 40 to about 10 parts by weight of a basic monomer copolymerizable with the monomer of element (a) having the formula

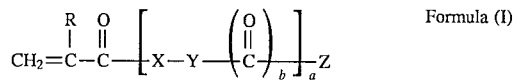   Formula (I)

wherein a represents an integer of 0 to 1;

b represents an integer of 0 to 1;

R is selected from the group consisting of H— and $CH_3$—;

X is selected from the group consisting of —O— and —NH—;

Y is a divalent linking group comprising 1 to 5 carbon atoms;

Z is a non-sterically hindered group

wherein $R^1$ is selected from the group consisting of H—, an electron donating group, and a radical which completes a ring structure including Y to form a heterocycle;

$R^2$ is selected from the group consisting of H—, an electron donating group, and a radical which completes a ring structure including Y to form a heterocycle, wherein $R^1$ and $R^2$ cannot simultaneously represent a radical which completes a ring structure including Y to form a heterocycle;

wherein when a=b, Z must not represent —$NH_2$; and further wherein when b=0 and a=1, $R^1$ may also represent

$R^2$ may also represent

wherein $R^3$ is an alkyl group comprising about 1 to about 6 carbon atoms provided that $R^1$ and $R^2$ cannot both simultaneously represent

and further wherein when b=0 and a=1, Z may also comprise a monovalent aromatic radical comprising 1 to 3 aromatic ring structures, preferably 1, wherein at least 1 aromatic ring structure contains a basic nitrogen atom as a member of the ring structure itself;

(c) about 0 to about 3 parts by weight of an acidic monomer copolymerizable with the monomers of elements (a) and (b) wherein when the acidic monomer is included, the basic copolymerizable monomer should be present in a molar excess; and (d) about 0.05 to about 1 percent by weight of a crosslinking agent based upon the total weight of (a) plus (b) plus (c).

Typically about 1 to about 3 parts by weight acidic monomer is used, if included, based upon 100 parts by weight total of (a) plus (b) plus (c).

The present invention also relates to a normally tacky and pressure-sensitive adhesive tape comprising a substrate, typically consisting of a sheet backing or a foam core (or a foam-like core) coated with a layer of the crosslinked pressure-sensitive adhesive composition.

The term "acidic" as used herein refers to a material having a pH of less than 7.

DETAILED DESCRIPTION OF THE INVENTION

The invention provides a pressure-sensitive adhesive composition and tape that has both a high cohesive strength and adheres permanently to acidic surfaces such as acid-rain resistant automotive paint systems.

(Meth)acrylate Esters

The acrylic copolymers useful in the adhesive of the invention contain from about 60 to about 90 parts per hundred parts monomer contained in the copolymer of at least one monofunctional unsaturated monomer selected from the group consisting of acrylate esters of non-tertiary alkyl alcohols, the alkyl groups of which comprise from 4 to about 12 carbon atoms; methacrylate esters of non-tertiary alkyl alcohols, the alkyl groups of which comprise from about 4 to about 12 carbon atoms; and mixtures thereof. Such acrylate or methacrylate esters generally have, as homopolymers, glass transition temperatures below about $-20°$ C.

Useful acrylate or methacrylate ester monomers include but are not limited to those selected from the group consisting of n-butyl acrylate, n-butyl methacrylate, isobutyl acrylate, 2-methyl butyl acrylate, 2-ethylhexyl acrylate, n-octyl acrylate, isooctyl acrylate, isooctyl methacrylate, isononyl acrylate, isodecyl acrylate, and mixtures thereof. Preferred acrylates include those selected from the group consisting of isooctyl acrylate, n-butyl acrylate, 2-ethylhexyl acrylate, and mixtures thereof. Acrylate or methacrylate or other vinyl monomers which, as homopolymers, have glass transition temperatures greater than about $-20°$ C. e.g., ethyl acrylate, methyl acrylate, isobornyl acrylate, vinyl acetate, and the like, may be utilized in conjunction with one or more of the acrylate or methacrylate ester monomers provided that the glass transition temperature of the resultant polymer is below about $-20°$ C.

Basic Monomers

Basic copolymerizable monomers are required in the pressure-sensitive adhesive of the present invention to enhance both the basic character and shear strength of these adhesives.

Useful copolymerizable basic polar monomers include but are not limited to the group consisting of N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, N-hexyl acrylamide, β-(dimethylamido)ethyl acrylate, N-methyl acrylamide, N-ethyl acrylamide, and mixtures thereof.

Preferably the pressure-sensitive adhesive composition of the present invention comprises from about 10 to about 30 parts by weight strongly basic copolymerizable monomers (monomers having non-sterically hindered tertiary amine terminal groups) if used, from about 30 to about 40 parts by weight weakly basic copolymerizable monomers (monomers having mono-alkyl substituted, non-sterically hindered terminal amide groups) if used, or from about 20 to about 40 parts by weight moderately basic copolymerizable monomers (monomers having di-alkyl substituted, non-sterically hindered terminal amide groups), if used.

The basic copolymerizable monomer is represented by Formula (I). Y is a divalent linking group comprising 1 to 5 carbon atoms and may optionally comprise 1 or more heteroatoms such as O, S, N, etc. Examples of specific Y groups include those selected from the group consisting of $-(CH_2)_n-$ wherein n represents an integer of 1 to 5, and divalent alkyl groups having internal linkages selected from the group consisting of ether linking groups, thioether linking groups, keto linking groups, urea linking groups urethane linking groups, amido linking groups, combinations thereof, and the like. Examples of specific Z groups when a=1 and b=0 include but are not limited to those selected from the group consisting of $-NH_2$, $-N(CH_3)_2$, $-N(C_2H_5)_2$, $-NH(CH_3)$, $-NH(C_2H_5)$, and $-NH(CH_2OCH_3)$. When a=0 or when a=b=1, Z can represent the previously listed groups except $-NH_2$ [i.e., the basic copolymerizable monomer cannot be acrylamide, cannot be methacrylamide, nor can it have an unsubstituted amide terminated group]. Additionally, when a=1 and b=0, Z can also comprise a monovalent aromatic radical comprising 1 to 3 aromatic ring structures, preferably 1, wherein at least 1 aromatic ring structure contains a basic nitrogen atom as a member of the ring structure itself, such as pyridinyl, imidazyl, and the like.

The basicity of the nitrogen containing monomers utilized in the present invention is defined by their substitution. As mentioned previously, $R^1$ and/or $R^2$ may in certain situations represent an electron donating group. Substituents that increase the electron density on a nitrogen by field effects or resonance in the case of aromatic bases such as pyridine will increase the basicity of nitrogen. Examples of electron donating groups which $R^1$ and/or $R^2$ can comprise include but are not limited to those selected from the group consisting of $-C(R^4)_3$, $-CH(R^4)_2$, $-CH_2(R^4)$, and $-CH_3$, wherein $R^4$ represents an alkyl group, typically an alkyl group comprising about 1 to about 6 carbon atoms. The higher the degree of substitution on the nitrogen by such linear or branched alkyl groups, the higher the basicity of the monomer. Conversely, substituents which decrease the electron density on the nitrogen of a basic copolymerizable monomer, such as a phenyl group will reduce the basicity of the monomer.

Using these general principles, several common basic copolymerizable monomers possess the following ascending order of basicity: Acrylamide <N-methyl acrylamide<N,N-dimethyl acrylamide <3-(3-pyridinyl)propyl acrylate<N,N-(dimethylamino)ethyl acrylamide.

In addition to these substituent effects on the basicity and usefulness of these monomers in the pressure-sensitive adhesive of the present invention, it is also important to prevent or minimize sterical hinderance of the nitrogen in basic copolymerizable monomer. As such, examples of non-sterically hindering electron donating groups present in the non-sterically hindered group Z defined above are $-CH(R^4)_2$; $-CH_2(R^4)$; and $-CH_3$ [i.e., not $-C(R^4)_3$] wherein $R^4$ is defined as above and cannot be a tertiary alkyl group, a cycloaliphatic group, nor can two $R^4$ groups combine to form a cyclic group (i.e., $R^4$ can be n-alkyl and sec-alkyl). Other non-sterically hindering electron donating groups $R^1$ and $R^2$ including but not limited to those selected from the group consisting of $-CH_2CH_2OCH_3$, $-CH_2OCH_2CH_3$, $-CH_2OCH_3$, can also be useful.

When Z represents a monovalent aromatic radical as described above, substituents on the basic nitrogen-containing ring structure which increase the electron density on the basic nitrogen (i.e., electron donating substituents such as alkyl or alkoxy groups) enhance the basicity of these types of basic copolymerizable monomers. Electron withdrawing substituents on the basic nitrogen-containing ring structure, such as halogens, $-COOH$, $-NO_2$, and the like, decrease the electron density on these aromatic nitrogens and, correspondingly, their basicity. Additionally, similar to the case when Z represents

sterical hinderance of such aromatic basic nitrogens by constraint of and/or the presence of bulky substituents such as a tert-butyl group on the basic nitrogen-containing ring structure must be minimized or prevented.

Preferred copolymerizable moderately and weakly basic monomers include those selected from the group consisting of N,N-dimethyl acrylamide, N,N-dimethyl methacrylamide, N,N-diethyl acrylamide, N,N-diethyl methacrylamide, N-methyl acrylamide, N-ethyl acrylamide, N-hexyl acrylamide, and mixtures thereof. Preferred strongly basic copolymerizable monomers include those selected from the group consisting of N,N-(dimethylamino)ethyl acrylate, N,N-(dimethylamino)ethyl methacrylate, N,N-(dimethylamino)propyl (meth)acrylate, 3-(3-pyridinyl)propyl acrylate, and mixtures thereof.

Acidic Monomers

Depending on its basicity, the amount of copolymerizable basic monomer used is from about 40 to about 10 parts per hundred parts of the final copolymer. As long as a molar excess of the copolymerizable basic monomer is maintained, low levels (typically about 1 to about 3 parts by weight) of an acidic monomer such as a carboxylic acid can be used to increase the cohesive strength of the pressure-sensitive adhesive. At higher levels, this copolymerizable acidic component tends to diminish the tack of the pressure-sensitive adhesive of the present invention.

Useful copolymerizable acidic monomers include but are not limited to those selected from the group consisting of ethylenically unsaturated carboxylic acids, ethylenically unsaturated sulfonic acids, and ethylenically unsaturated phosphoric acids. Examples of such compounds include those selected from the group consisting of acrylic acid, methacrylic acid, itaconic acid, fumaric acid, crotonic acid, citraconic acid and maleic acid, β-carboxyethyl acrylate, sulfoethyl methacrylate, and the like, and mixtures thereof.

Crosslinking Agents

A crosslinking agent is present in an amount of from about 0.05 to about 1 percent by weight in the pressure-sensitive adhesive of the present invention based upon the total weight of the monomers employed. The crosslinking agents are selected according to the polymerization method employed. Preferred crosslinking agents for the pressure-sensitive adhesive prepared via photopolymerization are multifunctional acrylates such as 1,6-hexanediol diacrylate as well as those disclosed in U.S. Pat. No. 4,379,201 (Heilmann et al., assigned to 3M Company), incorporated herein by reference, such as trimethylolpropane triacrylate, pentaerythritol tetraacrylate, 1,2-ethylene glycol diacrylate, and 1,12-dodecanediol diacrylate. Other useful crosslinking agents include the substituted triazines, such as those disclosed in U.S. Pat. Nos. 4,329,384 and 4,330,590 (Vesley, assigned to 3M Company), both incorporated herein by reference, e.g., 2,4-bis(trichloromethyl)-6-p-methoxystyrene-5-triazine and the chromophore halomethyl-5-triazines. Additional useful crosslinking agents include mono-ethylenically unsaturated aromatic ketones, particularly 4-acryloxybenzophenone, as described in U.S. Pat. No. 4,737,559 (Kellen et al., assigned to 3M Company), incorporated herein by reference.

Crosslinking agents useful in solution polymerized pressure-sensitive adhesive compositions are those which are free radically copolymerizable and which effect crosslinking through exposure to radiation, moisture or heat following polymerization. Such crosslinkers include the above mentioned photoactive substituted triazines and mono-ethylenically unsaturated aromatic ketones. Hydrolyzable, free radically copolymerizable crosslinkers, such as mono-ethylenically unsaturated mono-, di- and trialkoxy silane compounds including but not limited to methacryloxypropyl trimethoxysilane (sold under the tradename "Silane A-174" by Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinkers. Heat activated copolymerizable crosslinking agents, including but not limited to N-methylol acrylamide and acrylamido glycolic acid, can also be used to enhance the shear strength of the pressure-sensitive adhesive composition of the invention.

Polymerization Methods

The adhesive can be polymerized by any conventional free radical polymerization methods, including solution, emulsion, and suspension processes.

In one solution polymerization method, the acrylate ester component, basic copolymerizable component and, if used, acidic polar component along with a suitable inert organic solvent and free radically copolymerizable crosslinker are charged into a four-neck reaction vessel which is equipped with a stirrer, a thermometer, a condenser, addition funnel and a thermowatch. After this monomer mixture is charged into the reaction vessel, a concentrated thermal free radical initiator solution is added to the addition funnel. The whole reaction vessel and addition funnel and their contents are then purged with nitrogen to create an inert atmosphere. Once purged, the solution within the vessel is heated to about 55° C., the initiator is added, and the mixture is stirred during the course of the reaction. A 98 to 99 percent conversion should be obtained in about 20 hours.

Another polymerization method is the ultraviolet (UV) radiation initiated photopolymerization of the monomer mixture. This composition, along with suitable photoinitiator and crosslinker, is coated onto a flexible carrier web and polymerized in an inert, i.e., oxygen free, atmosphere, e.g., a nitrogen atmosphere. A sufficiently inert atmosphere can be achieved by covering a layer of the photoactive coating with a plastic film which is substantially transparent to ultraviolet radiation, and irradiating through that film in air using fluorescent-type ultraviolet lamps which generally give a total radiation dose of about 500 milliJoules/cm². The coating of the tapes may be accomplished using any conventional means such as roller coating, dip coating or extrusion coating.

It is noted that basic copolymerizable monomers which contain unblocked tertiary amines, such as N,N-(dimethylamino)propyl methacrylate and N,N-(dimethylamino)ethyl acrylate, are not suitable using this UV initiated photopolymerization method. Due to the presence of easily abstractable α-hydrogen atoms on such copolymerizable monomers, these tertiary amine-containing monomers can lead to undesirable and deleterious chain transfer and chain termination reactions which adversely effect the properties of the polymerized pressure-sensitive adhesive composition.

Other polymerization methods, such as the continuous free radical polymerization method described in U.S. Pat. Nos. 4,619,979 or 4,843,134 (both Kotnour et al., assigned to 3M Co.), both incorporated herein by reference, may also be utilized to prepare the pressure-sensitive adhesives of the present invention.

Initiators

Suitable thermal free radical initiators which may be utilized include but are not limited to those selected from the group consisting of azo compounds such as 2,2'-azobis(isobutyronitrile), hydroperoxides such as tert-butyl hydroperoxide, and peroxides such as benzoyl peroxide and cyclohexanone peroxide. Photoinitiators which are useful according to the invention include but are not limited to those selected from the group consisting of the benzoin ethers such as benzoin methyl ether or benzoin isopropyl ether, substituted benzoin ethers such as anisole methyl ether, substituted acetophenones such as 2,2-diethoxyacetophenone and 2,2-dimethoxy-2-phenyl acetophenone, substituted alpha-ketols such as 2-methyl-2-hydroxy propiophenone, aromatic sulfonyl chlorides such as 2-naphthalene sulfonyl chloride, and photoactive oximes such as 1-phenyl-1,1-propanedione-2-(0-ethoxycarbonyl)-oxime. For both thermal and radiation induced polymerizations, the initiator is present in an amount of about 0.05 to about 0.5 percent by weight based upon the total weight of the monomers of the instant pressure-sensitive adhesive compositions.

Solvents

Suitable inert organic solvent, if required, may be any organic liquid which is inert to the reactants and product and will not otherwise adversely affect the reaction. Such solvents include ethyl acetate, acetone, methyl ethyl ketones, and mixtures thereof. The amount of solvent is generally about 30–80% by weight based on the total weight of the reactants (monomer, crosslinker, initiator) and solvent.

Substrates

The tapes of the invention also comprise a backing or core layer. The backing may comprise a material including but not limited to those selected from the group consisting of polyesters, polyvinylchloride, polypropylenes, polyurethanes, and fluorinated ethylene-propylenes. The core layer may comprise material including but not limited to those selected from the group consisting of polyacrylates, polyethylenes, polypropylenes, neoprenes, polyolefins, polyurethanes, and silicones.

In one embodiment, the substrate used is that described in U.S. Pat. No. 4,223,067 (Levens, assigned to 3M Company), incorporated herein by reference, the core layer consists of an ultraviolet-radiation polymerized acrylic copolymer which may incorporate similar or dissimilar acrylic monomers having similar or different additives from those acrylic copolymers contained in the adhesive layer. The core layers can comprise 80 or more parts of an alkyl acrylate polymer and, correspondingly, up to about 20 parts of a strongly polar copolymerizable monomer, based on 100 parts by weight total.

Such core layer may be a foam-like layer, e.g., a monomer blend comprising microspheres may be used. The microspheres may be glass or polymeric. The microspheres should have an average diameter of 10 to 200 micrometers, and comprise from about 5 to about 65 volume percent of the core layer. The thickness of foam-like layers in preferred tapes of the invention range from 0.3 mm to about 4.0 mm in thickness. When microspheres are present in the acrylate matrix, the polymerized adhesive will have a foam-like appearance.

When glass microspheres are used, the pressure-sensitive adhesive layer should be at least 3 times as thick as their diameter, preferably at least 7 times. The thickness of layers containing such glass microspheres should be at least 6 times, preferably at least 20 times that of each microsphere-free layer.

Other useful materials which can be blended into the pressure-sensitive adhesive layer or the core layer include, but are not limited to those selected from the group consisting of fillers, pigments, woven and nonwoven fabrics, foaming agents, antioxidants, stabilizers, fire retardants, and viscosity adjusting agents.

The present invention provides a composite comprising a solid acidic surface coated with the adhesive of the invention. The solid acidic surface can be selected from the group consisting of plastics such as polyvinylchloride, elastomers, foams such as polyacrylate foam, etc. The solid acidic surface may comprise a paint coating. The solid acidic surface may comprise an automotive coating which may be a paint, a topcoat, etc. The composite may further comprise an article bonded via the adhesive of the invention to the solid acidic surface. The article may be selected from the group consisting of emblems, moldings, decals, films, etc.

Test Methods

180° Peel Adhesion

This test is conducted in accordance with ASTM D3330-87. A strip of tape 12.7 mm wide and about 20 cm long is adhered (with the functional adhesive layer down) at one end of a test panel. The other end is held such that the strip does not touch the test panel. The strip is then rolled down with a 2 kg hard rubber covered steel roller and allowed to dwell for the time periods specified in the following tables. The free end of the tape is then double-backed and the 180° peel is then measured at 300 mm min$^{-1}$ peel back rate. The peel force, measured in Newtons/decimeter (N/dm), and the peel failure mode (as defined below) is then recorded:

Foam Split (FS)—cohesive failure of the foam (the desired mode of peel failure);

Foam/Primer (FP)—interfacial failure between primer coating layer and foam backing;

Pop Off (POP)—clean adhesive failure from the paint surface.

90° Peel Adhesion

A strip of tape 12.7 mm wide and about 12.7 cm long is adhered (with the functional adhesive layer down) at one end of a test panel, leaving about 2.5 cm of the tape free so that it can be clamped in the upper jaw of the Instron™ tensile testing device. The strip is then rolled down with a 4.54 kg steel roller and allowed to dwell for the time periods specified in the Tables. The test panel is then clamped in a special fixture for the lower jaw of the Instron™ that maintains a 90° peel angle as the tape is peeled from the test panel. The free end of the tape is then clamped in the upper jaw of the Instron™ and the tape sample is peeled at a rate of 300 mm min$^{-1}$. The peel force, measured in Newtons/decimeter (N/dm), and the peel failure mode (as defined below) is then recorded.

Foam Split (FS)—cohesive failure of the foam (the desired mode of peel failure);

Shocky (SH)—combination of adhesive and cohesive failures (some foam residue remaining on paint surface)

Pop Off (POP)—clean adhesive failure from the paint surface.

Static Shear Test

This test is conducted in accordance with ASTM D3654M-88. A 12.7 mm wide×25.4 mm long test sample of the side of the tape coated with the adhesive of the present invention is adhered to a test panel. The liner is then removed from the sample and the newly exposed surface (non-functional side) is then applied to a stainless steel panel. The test sample is then placed in a horizontal position and a 1 kg weight is applied for a period of 15 minutes to ensure intimate contact between the PSA and the test panels. The assembly is then mounted in a test stand at an angle of 0° to 2° with the vertical and the weight specified in the Tables is applied. The time to failure is reported in minutes. After 5,000 minutes (or 10,000 minutes), the test is discontinued.

Abbreviations and Trade names

| | |
|---|---|
| AA | acrylic acid |
| ABP | 4-acryloxybenzophenone |
| AZA | aziridine amide crosslinker |
| BA | n-butyl acrylate |
| DMAEMA | N,N-(dimethylamino)ethyl methacrylate |
| IOA | isooctyl acrylate |
| HAcm | N-hexyl acrylamide |
| HDDA | 1,6-hexanediol diacrylate |
| hr. | hour |
| MA | methyl acrylate |
| min. | minutes |
| MOMA | N-morpholinoethyl methacrylate |
| MOA | N-morpholinoethyl acrylate |
| NNDMA | N,N-dimethyl acrylamide |
| NVP | N-vinyl pyrrolidone |
| OAcm | N-octyl acrylamide |
| PPA | 3-(3-pyridinyl)propyl acrylate |
| R.T. | room temperature |

The following examples are to be considered as illustrative in nature, and are not limiting in any way. The scope of the invention is that which is defined in the claims. All parts, percentages, ratios, etc. in the Examples and the rest of the specification are by weight unless indicated otherwise.

EXAMPLES

Example 1

A mixture of 70 parts isooctyl acrylate (IOA), 30 parts of the moderately basic copolymerizable monomer N,N-dimethyl acrylamide (NNDMA), 0.04 part 2,2-dimethoxy-2-phenyl acetophenone (obtained as Irgacure™-651 from Ciba-Geigy Corporation) was inerted and partially photopolymerized under ultraviolet (UV) irradiation (40 watt fluorescent black lamp having 90% of the emissions between 300 and 400 nm and a maximum at 351 nm and which provides radiation intensity of about 1–2 mW/cm$^2$) to yield a coatable syrup of about 3,000 cPs. After adding 0.1 part of Irgacure™-651 and 0.08 part 1,6-hexanediol diacrylate (HDDA) to the syrup with thorough mixing, the sample was coated at 100 micrometer thickness between two siliconized polyester liners and polymerized under a bank of the same fluorescent UV lamps. The total UV dose was about 400 mJ cm$^{-2}$.

One of the liners was then removed and the pressure-sensitive adhesive layer was heat laminated to an acrylic foam core. The foam core was made in accordance with U.S. Pat. No. 4,415,615 (Esmay et al.), incorporated herein by reference. Removal of the second release liner yielded a pressure-sensitive foam tape ready for 180° peel adhesion and static shear testing as described above against an acidic acid-rain resistant paint test panel. The results of these tests can be found in Table 1.

Example 2

A foam tape sample was made and tested as in Example 1, except at a ratio of 68 parts IOA and 32 parts NNDMA. The results of these tests can be found in Table 1.

Example 3

A foam tape sample was made and tested as in Example 1, except at a ratio of 65 parts IOA and 35 parts NNDMA. The results of these tests can be found in Table 1.

Example 4

A foam tape sample was made and tested as in Example 1, except at a ratio of 32.5 parts IOA, 32.5 parts n-butyl acrylate (BA), and 35 parts NNDMA. The results of these tests can be found in Table 1.

Example 5

A foam tape sample was made as in Example 1, except at a ratio of 67.3 parts IOA, 31 parts NNDMA, and 1.7 parts acrylic acid (AA). The results of these tests can be found in Table 1.

Comparative Example C-1

For this comparative example, a foam tape sample was made as in Example 1, except at a ratio of 90 parts IOA and 10 parts AA. The results of these tests can be found in Table 1.

Comparative Example C-2

For this comparative example, a foam tape sample was made as in Example 1, except at ratio of 42 parts IOA, 46 parts BA and 12 parts AA. The results of these tests can be found in Table 1.

Comparative Example C-3

For this comparative example, a foam tape sample was made and tested as in Example 1, except at ratio of 47 parts IOA, 47 parts BA and 6 parts AA. The results of these tests can be found in Table 1.

TABLE 1

| | | | 180° Peel, (N/dm) | | | Static Shear*, 70° C. | |
|---|---|---|---|---|---|---|---|
| | | | 20 min. | 24 hr. | 24 hr. | | |
| Ex. | Comp. | Amounts | R.T. | R.T. | 80° C. | 1000 g | 500 g |
| 1 | IOA/NNDMA/ HDDA | 70/30/0.08 | 231.2 (FS) | 215.7 (FS) | 106.2 (FS) | 114 (POP) | 5000+ |
| 2 | IOA/NNDMA/ HDDA | 68/32/0.08 | 213.3 (FS) | 214.9 (FS) | 108.7 (FS) | 311 (POP) | 5000+ |
| 3 | IOA/NNDMA/ HDDA | 65/35/0.08 | 204.3 (FS) | 224.7 (FS) | 114.4 (FS) | 423 (POP) | 5000+ |
| 4 | IOA/BA/ NNDMA/ HDDA | 32.5/32.5/ 35/.08 | 158.5 | 194.5 | 107.1 (FS) | 5000+ | |

TABLE 1-continued

|  |  |  | 180° Peel, (N/dm) | | | Static Shear*, | |
|---|---|---|---|---|---|---|---|
|  |  |  | 20 min. | 24 hr. | 24 hr. | 70° C. | |
| Ex. | Comp. | Amounts | R.T. | R.T. | 80° C. | 1000 g | 500 g |
| 5 | IOA/NNDMA/ AA/HDDA | 67.3/31/ 1.7/0.08 | 138.9 | 147.1 | 94.8 | 5000+ | |
| C-1 | IOA/AA/ HDDA | 90/10/0.08 | 113.6 | 118.5 | 35.1 | | |
| C-2 | IOA/BA/AA/ HDDA | 42/46/12/ 0.08 | | 112 | 4.1 | | |
| C-3 | IOA/BA/AA/ HDDA | 47/47/6/ 0.08 | 62.9 | 63.7 | 19.6 | | |

*Measured in minutes

Table 1 shows that the tapes of the present invention wherein the adhesives containing NNDMA have high adhesion and high cohesion values at a wide temperature range as opposed to those tapes in which the adhesives do not contain NNDMA.

Example 6

A 250 ml round bottom flask was equipped with a stirrer, a condenser and an addition funnel. 40 ml of the monomer mix consisting of 70 parts of isooctyl acrylate (IOA), 30 parts of N,N-dimethyl acrylamide (NNDMA), and 0.2 parts acryloxy-benzophenone (ABP) and 50 ml of ethylacetate was charged in this flask and a solution of 0.08 g. of VAZO™ 64 [2,2'-azobis(isobutyronitrile), an initiator commercially available from duPont] in 10 ml ethyl acetate was added to the addition funnel. This reaction apparatus was then inerted with nitrogen and the flask contents were heated to 55° C. The initiator solution was added to the flask and the temperature was maintained at 55° C. for about 20 hours. The sample was allowed to cool to room temperature. The cooled solution was then coated on a siliconized release liner and oven dried to give a dried coating thickness of about 1.5 mils. Exposure of the sample to about 80 mJ cm$^{-2}$ of high intensity UV (medium pressure mercury lamps, no inerting) yielded a tape having a UV cured pressure-sensitive adhesive coating. This UV cured adhesive was then heat laminated at about 60° C. to a foam core similar to that described in Example 1 without the use of any primer and subjected to 90° Peel Adhesion testing against an acidic acid-rain resistant paint test panel which was identical to that used in Example 1 and static shear testing using a stainless steel test panel. The results of these tests can be found in Table 2.

Example 7

A foam tape sample was made and tested as in Example 6, except at a ratio of 80 parts IOA, 20 parts NNDMA, and 0.2 parts ABP. The results of these tests can be found in Table 2.

Example 8

A foam tape sample was made and tested as in Example 6, except at a ratio of 70 parts n-butyl acrylate (BA), 30 parts NNDMA, and 0.2 parts ABP. The results of these tests can be found in Table 2.

Example 9

A foam tape sample was made and tested as in Example 6, except at a ratio of 80 parts BA, 20 parts NNDMA, and 0.2 parts ABP. The results of these tests can be found in Table 2.

Comparative Example C-4

For this comparative example, a foam tape sample was made and tested as in Example 6, except the formulation of IOA/NNDMA/ABP was equal to 90/10/0.2. The results of these tests can be found in Table 2.

Comparative Example C-5

For this comparative example, a foam tape sample was made and tested as in Example 6, except at ratio of 90 parts BA, 10 parts NNDMA, and 0.2 parts ABP. The results of these tests can be found in Table 2.

Comparative Example C-6

For this comparative example, a foam tape sample was made according to the following method. To a 1 liter mixing vessel was charged 98.8 parts IOA, 45.6 parts methyl acrylate (MA), 7.6 AA, 248 parts ethyl acetate and 0.456 parts VAZO™ 64. This mixture (IOA/MA/AA=65/30/5) was then purged with nitrogen for two minutes (1 liter/min. flow), sealed, and placed in a rotary water bath at 55° C. for 24 hours. The inherent viscosity of the product was 1.8 dL/g in ethyl acetate. The solution was diluted with toluene to 20.7% solids and 0.5 part of a proprietary multifunctional aziridine amide crosslinker (AZA) at 5 % solids in toluene was added to 100 parts of the solution. This mixture was reverse-roll coated and cured in a forced air oven to form a transfer tape. This transfer tape was then heat laminated at about 60° C. to an acrylic foam core which had previously been primed and dried at 80° C. for 15 minutes in a forced air oven. This foam tape sample was tested as in Example 6 and the results of these tests can be found in Table 2.

TABLE 2

| Ex. | Comp. | Amounts | 90° Peel, RT (N/dm) 20 min. | 24 hr. | 90 hr. | Static Shear*, R.T. 1000 g | 500 g |
|---|---|---|---|---|---|---|---|
| 6 | IOA/NNDMA/ABP | 70/30/0.2 | 206.6 | 374.8 (FS) | | 3071 (POP) | 10000+ |
| 7 | IOA/NNDMA/ABP | 80/20/0.2 | 154.1 | 241.7 | 248.7 (SH) | 201 (POP) | 10000+ |
| 8 | BA/NNDMA/ABP | 70/30/0.2 | 224.2 | 378.3 (FS) | | 5202 (POP) | 10000+ |
| 9 | BA/NNDMA/ABP | 80/20/0.2 | 150.6 | 241.7 | 318.7 (SH) | 282 (POP) | 9724 (POP) |
| C-4 | IOA/NNDMA/ABP | 90/10/0.2 | 84.1 | 94.6 | | 134 (POP) | 8124 (POP) |
| C-5 | BA/NNDMA/ABP | 90/10/0.2 | 84.1 | 119.1 | | 270 (POP) | 5198 (POP) |
| C-6 | IOA/MA/AA/AZA | 65/30/5/0.12 | 175.1 | 224.2 | 252.2 | 10000+ | 10000+ |

*Measured in minutes

Examples 6–9 demonstrate the need for the use of at least 20 parts by weight of a moderately basic copolymerizable monomer in the preparation of pressure-sensitive adhesives of the present invention. As illustrated in Table 2, Examples C-4 and C-5, which have insufficient basic functionality at 10 parts by weight NNDMA, and the acidic Example C-6 fail to exhibit the preferred foam split adhesion failure when adhered to test panels coated with an acid-rain resistant coating.

Example 10

A foam tape sample was made and tested as in Example 6, except at a ratio of 70 parts IOA, 30 parts N-hexyl acrylamide (HAcm), and 0.2 parts ABP. The results of these tests can be found in Table 3.

Comparative Example C-7

A foam tape sample was made and tested as in Example 6, except at a ratio of 80 parts IOA, 20 parts HAcm, and 0.2 parts ABP. The results of these tests can be found in Table 3.

Example 11

A foam tape sample was made and tested as in Example 6, except at a ratio of 70 parts BA, 30 parts HAcm, and 0.2 parts ABP. The results of these tests can be found in Table 3.

Comparative Example C-8

A foam tape sample was made and tested as in Example 6, except at a ratio of 80 parts BA, 20 parts HAcm, and 0.2 parts ABP. The results of these tests can be found in Table 3.

Example 12

A foam tape sample was made and tested as in Example 6, except that 50 ml of a monomer mix of 80 parts BA, 20 parts N,N-(dimethylamino)ethyl methacrylate (DMAEMA) and 0.2 parts ABP in 40 ml of ethyl acetate was charged in the reaction flask. The results of these tests can be found in Table 3.

Example 13

A foam tape sample was made and tested as in Example 14, except at a ratio of 90 parts BA, 10 parts DMAEMA, and 0.2 parts ABP. The results of these tests can be found in Table 3.

TABLE 3

| Ex. | Comp. | Amounts | 90° Peel, RT (N/dm) 20 min. | 24 hr. | 90 hr. | Static Shear*, R.T. 1000 g | 500 g |
|---|---|---|---|---|---|---|---|
| 10 | IOA/HAcm/ABP | 70/30/0.2 | 178.6 | 252.2 | 297.7 | 316 (POP) | 10000+ |
| C-7 | IOA/HAcm/ABP | 80/20/0.2 | 105.1 | 147.1 | 168.1 | 263 (POP) | 10000+ |
| 11 | BA/HAcm/ABP | 70/30/0.2 | 150.6 | 224.2 | 283.7 | 69 (POP) | 7124 (POP) |
| C-8 | BA/HAcm/ABP | 80/20/0.2 | 105.1 | 119.1 | 133.1 | 55 (POP) | 4321 (POP) |
| 12 | BA/DMAEMA/ | 80/20/0.2 | 143.6 | 364.3 | | 211 | 7121 |

TABLE 3-continued

| Ex. | Comp. | Amounts | 90° Peel, RT (N/dm) | | | Static Shear*, R.T. | |
|---|---|---|---|---|---|---|---|
| | | | 20 min. | 24 hr. | 90 hr. | 1000 g | 500 g |
| 13 | ABP BA/DMAEMA/ ABP | 90/10/0.2 | 94.6 | (FS) 350.3 (FS) | | (POP) 130 (POP) | (POP) 5334 (POP) |

*Measured in minutes

Examples 10–13 demonstrate that the use of at least 30 weight % of a weakly basic copolymerizable monomer (N-hexyl acrylamide) and at least 10 weight % of a strongly basic copolymerizable monomer, N,N-(dimethylamino)ethyl methacrylate, is required in the preparation of pressure-sensitive adhesives of the present invention. As illustrated in Table 3, these pressure-sensitive adhesive compositions effectively adhere (characterized both by their foam split adhesion failures and their superior performance to the acidic Example C-6) to the test panel coated with an acid-rain resistant coating.

Example 14

A foam tape sample was made and tested as in Example 6, except at a ratio of 68 parts IOA, 30 parts NNDMA, 2 parts acrylic acid (AA), and 0.2 parts ABP. The results of these tests can be found in Table 4.

Comparative Example C-9

For this comparative example, a foam tape sample was made and tested as in Example 14, except the formulation of IOA/NNDMA/AA/ABP was equal to 65/30/5/0.2. The results of these tests can be found in Table 4.

Comparative Example C-10

For this comparative example, a foam tape sample was made and tested as in Example 15, except at ratio of 65 parts BA, 30 parts NNDMA, 5 parts AA, and 0.2 parts ABP. The results of these tests can be found in Table 4.

TABLE 4

| Ex. | Comp. | Amounts | 90° Peel, RT (N/dm) 24 hr. | Static Shear*, R.T. | |
|---|---|---|---|---|---|
| | | | | 1000 g | 500 g |
| 14 | IOA/NNDMA/ AA/ABP | 68/30/2/0.2 | 353.8 (FS) | 10000+ | 10000+ |
| 15 | BA/NNDMA/ AA/ABP | 68/30/2/0.2 | 273.2 (FS) | 10000+ | 10000+ |
| 16 | IOA/DMAEMA/ AA/ABP | 78/20/2/0.2 | 371.3 (FS) | | |
| 17 | BA/DMAEMA/ AA/ABP | 78/20/2/0.2 | 364.3. (FS) | | |
| C-9 | IOA/NNDMA/ AA/ABP | 65/30/5/0.2 | TACK-FREE | | |
| C-10 | BA/NNDMA/ AA/ABP | 65/30/5/0.2 | TACK-FREE | | |

*Measured in minutes

Example 15

A foam tape sample was made and tested as in Example 6, except at a ratio of 68 parts BA, 30 parts NNDMA, 2 parts AA, and 0.2 parts ABP. The results of these tests can be found in Table 4.

Example 16

A foam tape sample was made and tested as in Example 6, except at a ratio of 78 parts IOA, 20 parts DMAEMA, 2 parts AA, and 0.2 parts ABP. The results of these tests can be found in Table 4.

Example 17

A foam tape sample was made and tested as in Example 6, except at a ratio of 78 parts BA, 20 parts DMAEMA, 2 parts AA, and 0.2 parts ABP. The results of these tests can be found in Table 4.

Examples 14–17, C-9 and C-10 illustrate the effect of small amounts of acidic copolymerizable monomer (acrylic acid) on the performance of the pressure-sensitive adhesives of the present invention. As demonstrated by examples C-7 and C-8, the formulation can only contain low levels of such acidic monomers. These low levels of acidic copolymerizable monomer can reinforce the adhesive. As little as 5 parts by weight of these monomers, however, can render the adhesives non-tacky through the intra- (or inter-) molecular acid-base interaction with the basic copolymerizable monomer and diminish the basic character required in the pressure-sensitive adhesives of the present invention.

Example 18

The foam tape samples made in accordance with Examples 6, 8, 12–15, and C-6 were tested for their peel adhesions against an epoxy-acid crosslinked acid-rain resistant coating available from PPG Industries. The results of these 90° peel adhesion tests are recorded in Table 5.

TABLE 5

| Ex. | Comp. | Amounts | 90° Peel, RT (N/dm) | |
|---|---|---|---|---|
| | | | 20 min. | 72 hr. |
| 6 | IOA/NNDMA/ABP | 70/30/0.2 | 350.3 (FS) | |
| 8 | BA/NNDMA/ABP | 70/30/0.2 | 322.2 (SH) | |
| 12 | BA/DMAEMA/ABP | 80/20/0.2 | 157.6 | 182.1 (SH) |
| 13 | BA/DMAEMA/ABP | 90/10/0.2 | 301.2 (FS) | |
| 14 | IOA/NNDMA/AA/ABP | 68/30/2/0.2 | 147.1 (SH) | |
| 15 | BA/NNDMA/AA/ABP | 68/30/2/0.2 | 406.3 (FS) | |
| C-6 | IOA/MA/AA/AZA | 65/30/5/0.12 | 262.7 | 385.3 (FS) |

The foam tape samples in Table 5 provide the desired peel failure (foam split or shocky) using pressure-sensitive adhesives containing strongly and moderately basic copolymerizable monomers against this non-melamine crosslinked, acid-rain resistant coating.

Example 19

Foam tape samples prepared similarly to those of Examples 6, 8, 13–15, and C-6 were tested for their adherence against an epoxy-acid crosslinked acid-rain resistant automotive coating (DCT-5001, available from PPG Industries). The results of these tests are recorded in Table 6.

TABLE 6

| Ex. | Comp. | Amounts | 90° Peel, RT (N/dm) | |
|---|---|---|---|---|
| | | | 20 min. | 72 hr. |
| 6 | IOA/NNDMA/ABP | 70/30/0.2 | 273.2 (FS) | |
| 8 | BA/NNDMA/ABP | 70/30/0.2 | 329.2 (FS) | |
| 13 | BA/DMAEMA/ABP | 90/10/0.2 | 385.3 (FS) | |
| 14 | IOA/NNDMA/AA/ABP | 68/30/2/0.2 | 378.3 (FS) | |
| 15 | BA/NNDMA/AA/ABP | 68/30/2/0.2 | 374.8 (FS) | |
| C-6 | IOA/MA/AA/AZA | 65/30/5/0.12 | 308.2 | 357.3 (FS) |

The foam tape samples in Table 6 provide the desired peel failure (foam split) and improved initial tack using pressure-sensitive adhesives containing strongly and moderately basic copolymerizable monomers against this epoxy-acid crosslinked, acid-rain resistant coating.

Comparative Example C-11

For this comparative example, a foam tape sample was made and tested as in Example 6 using a sterically hindered, strongly basic copolymerizable monomer [N-morpholinoethyl acrylate (MOA)] in a formulation of BA/MOA/ABP equal to 80/20/0.2. The results of these tests can be found in Table 7.

Comparative Example C-12

For this comparative example, a foam tape sample was made and tested as in Example 6 using a sterically hindered, strongly basic copolymerizable monomer [N-morpholinoethyl methacrylate (MOMA)] in a formulation of IOA/MOMA/ABP equal to 80/20/0.2. The results of these tests can be found in Table 7.

Comparative Example C-13

For this comparative example, a foam tape sample was made and tested as in Example 6 using a sterically hindered, strongly basic copolymerizable monomer (MOA) in a formulation of BA/MOA/ABP equal to 85/15/0.2. The results of these tests can be found in Table 7.

Comparative Example C-14

For this comparative example, a foam tape sample was made and tested as in Example 6 using a sterically hindered, strongly basic copolymerizable monomer (MOMA) in a formulation of IOA/MOMA/ABP equal to 85/15/0.2. The results of these tests can be found in Table 7.

Comparative Example C-15

For this comparative example, a foam tape sample was made and tested as in Example 6 using a sterically hindered, strongly basic copolymerizable monomer (MOA) in a formulation of BA/MOA/ABP equal to 90/10/0.2. The results of these tests can be found in Table 7.

Comparative Example C-16

For this comparative example, a foam tape sample was made and tested as in Example 6 using a sterically hindered, strongly basic copolymerizable monomer (MOMA) in a formulation of IOA/MOMA/ABP equal to 90/10/0.2. The results of these tests can be found in Table 7.

Comparative Example C-17

For this comparative example, a foam tape sample was made and tested as in Example 16 using a sterically hindered, strongly basic copolymerizable monomer (MOA) and small amounts of an acidic copolymerizable monomer (AA) in a formulation of IOA/MOA/AA/ABP equal to 78/20/2/0.2. The results of these tests can be found in Table 7.

Comparative Example C-18

For this comparative example, a foam tape sample was made and tested as in Example 14 using a sterically hindered, strongly basic copolymerizable monomer (MOA) and small amounts of an acidic copolymerizable monomer (AA) in a formulation of IOA/MOA/AA/ABP equal to 75/20/5/0.2. The results of these tests can be found in Table 7.

TABLE 7

| Ex. | Comp. | Amounts | 90° Peel, RT (N/dm) | |
|---|---|---|---|---|
| | | | 20 min. | 24 hr. |
| C-11 | BA/MOA/ABP | 80/20/0.2 | 98.1 | 108.6 |
| C-12 | IOA/MOMA/ABP | 80/20/0.2 | 77.1 | 66.5 |
| C-13 | BA/MOA/ABP | 85/15/0.2 | 77.1 | 101.6 |
| C-14 | IOA/MOMA/ABP | 85/15/0.2 | 63.0 | 66.5 |
| C-15 | BA/MOA/ABP | 90/10/0.2 | 66.5 | 84.1 |
| C-16 | IOA/MOMA/ABP | 90/10/0.2 | 73.6 | 66.5 |

TABLE 7-continued

| Ex. | Comp. | Amounts | 90° Peel, RT (N/dm) | |
|---|---|---|---|---|
| | | | 20 min. | 24 hr. |
| C-17 | IOA/MOA/AA/ABP | 78/20/2/0.2 | 98.1 | 87.6 |
| C-18 | IOA/MOA/AA/ABP | 75/20/5/0.2 | 196.1 | 220.7 |
| C-6 | IOA/MA/AA/AZA | 65/30/5/0.12 | 199.6 | 245.2 |

Comparative Example C-19

For this comparative example, a foam tape sample was made and tested as in Example 6 using a sterically hindered, weakly basic copolymerizable monomer [N-octyl acrylamide (OAcm)] in a formulation of IOA/OAcm/ABP equal to 70/30/0.2. The results of these tests can be found in Table 8.

Comparative Example C-20

For this comparative example, a foam tape sample was made and tested as in Example 8 using a sterically hindered, weakly basic copolymerizable monomer (OAcm) in a formulation of BA/OAcm/ABP equal to 70/30/0.2. The results of these tests can be found in Table 8.

TABLE 8

| Ex. | Comp. | Amounts | 90° Peel, RT (N/dm) | | | Static Shear*, R.T. | |
|---|---|---|---|---|---|---|---|
| | | | 20 min. | 24 hr. | 90 hr. | 1000 g | 500 g |
| C-19 | IOA/OAcm/ABP | 70/30/0.2 | 150.6 | 171.6 | 203.1 | 867 (POP) | 2879 (POP) |
| C-20 | BA/OAcm/ABP | 70/30/0.2 | 161.1 | 189.1 | 224.2 | 45 (POP) | 7103 (POP) |
| C-6 | IOA/MA/AA/AZA | 65/30/5/0.12 | 175.1 | 224.2 | 252.2 | 10000+ | 10000+ |

*Measured in minutes

Tables 7 and 8 demonstrate the effects of constrained nitrogen heterocyclic structures and bulky substituents on the accessibility of the basic nitrogen in the basic copolymerizable monomer. The sterical hinderance caused by such substituents results in a lowered adhesion (lower than even the foam tape samples of C-6 which have no nitrogen-containing component) to the test panels coated with an acid-rain resistant coating.

Example 20

A mixture of 70 parts isooctyl acrylate (IOA), 30 parts of the moderately basic copolymerizable monomer N,N-dimethyl acrylamide (NNDMA), 0.04 part 2,2-dimethoxy-2-phenyl acetophenone (obtained as Irgacure™-651 2,2-dimethoxy-2-phenyl acetophenone from Ciba-Geigy Corporation) was inerted and partially photopolymerized under ultraviolet (UV) irradiation (40 watt fluorescent black lamp) to yield a coatable syrup of about 3,000 cPs. After adding 0.1 part of Irgacure™-651 and 0.08 part 1,6-hexanediol diacrylate (HDDA) to the syrup with thorough mixing, the sample was coated at 100 micrometer thickness between two siliconized polyester liners and polymerized under a bank of the same fluorescent UV lamps. The total UV dose was about 400 mJ cm$^{-2}$.

One of the release liners was then removed and the pressure-sensitive adhesive layer was heat-laminated to one major surface of a neoprene foam core coated with an acrylate based adhesive. Removal of the second release liner from the 70/30/0.08 IOA/NNDMA/HDDA layer yielded a pressure-sensitive foam tape ready for 180° peel adhesion and static shear testing as described above against an alternative surface of acidic character (i.e., polyvinyl chloride). The results of these tests can be found in Table 9.

Example 21

A foam tape sample was made and tested as in Example 20, except at a ratio of 65 parts IOA and 35 parts NNDMA. The results of these tests can be found in Table 9.

Example 22

A foam tape sample was made and tested as in Example 20, except at a ratio of 32.5 parts IOA, 32.5 parts BA, and 35 parts NNDMA. The results of these tests can be found in Table 9.

Example 23

A foam tape sample was made as in Example 20, except at a ratio of 68 parts IOA, 31 parts NNDMA, and 1.0 parts AA. The results of these tests can be found in Table 9.

Example 24

A foam tape sample was made as in Example 20, except at a ratio of 64 parts IOA, 33 parts NNDMA, and 3 parts AA. The results of these tests can be found in Table 9.

Comparative Example C-21

For this comparative example, a foam tape sample was made as in Example 20, except at a ratio of 90 parts IOA and 10 parts AA. The results of these tests can be found in Table 9.

Comparative Example C-22

For this comparative example, a foam tape sample was made as in Example 20, except at ratio of 75 parts IOA and 25 parts n-vinyl pyrrolidone (NVP). The results of these tests can be found in Table 9.

Comparative Example C-23

For this comparative example, a foam tape sample was made and tested as in Example 20, except at ratio of 44 parts IOA, 44 parts BA, and 12 parts AA. The results of these tests can be found in Table 9.

Comparative Example C-24

For this comparative example, the adhesive of Comparative Example C-6 was heat laminated to the neoprene core of Example 20. This foam tape sample was tested as in Example 20 and the results of these tests can be found in Table 9.

TABLE 9

| Ex. | Comp. | Amounts | 180° Peel, (N/dm) | |
|---|---|---|---|---|
| | | | 20 min. R.T. | 24 hr. R.T. |
| 20 | IOA/NNDMA/HDDA | 70/30/0.08 | 223.1 | 256.6 (FP) |
| 21 | IOA/NNDMA/HDDA | 65/35/0.08 | 241.9 | 264.0 (FP) |
| 22 | IOA/BA/NNDMA/HDDA | 32.5/32.5/35/0.08 | 266.4 | 276.2 (FP) |
| 23 | IOA/NNDMA/AA/HDDA | 68/31/1/0.08 | 272.1 | 280.3 (FP) |
| 24 | IOA/NNDMA/AA/HDDA | 64/33/3/0.08 | 278.7 | 268.9 (FP) |
| C-21 | IOA/AA/HDDA | 90/10/0.08 | 134.0 | 158.5 |
| C-22 | IOA/NVP/HDDA | 75/25/0.08 | 221.5 | 277.0 |
| C-23 | IOA/BA/AA/HDDA | 44/44/12/0.08 | 167.5 | 197.0 |
| C-24 | IOA/MA/AA/AZA | 65/30/5/0.12 | 167.5 | 226.4 (FP) |

Similar to their superior performance against acidic acid-rain resistant coatings, the pressure-sensitive adhesives of the present invention provide excellent adhesion to the polyvinyl chloride test panel due to an analogous acid/base interaction between the adhesive layer and the PVC surface.

Example 25

A foam tape sample was made as in Example 6 and was tested for adherence against an epoxy-acid crosslinked acid-rain resistant coating from PPG Industries, identical to that used in Example 18, at a ratio of 88 parts BA, 10 parts 3-(3-pyridinyl)propyl acrylate (PPA) and 2 parts AA. The results of this test can be found in Table 10.

Example 26

A foam tape sample was made and tested as in Example 25, except at a ratio of 78 parts BA, 20 parts PPA and 2 parts AA. The results of this test can be found in Table 10.

TABLE 10

| Ex. | Comp. | Amounts | 90° Peel, RT (N/dm) | |
|---|---|---|---|---|
| | | | 24 hrs. | 72 hrs. |
| 25 | BA/PPA/AA/ABP | 88/10/2/0.08 | 173.4 | 305.1 (SH) |
| 26 | BA/PPA/AA/ABP | 78/20/2/0.08 | 262.7 | 412.9 (FS) |

Example 27

A foam tape sample was made as in Example 6 and was tested for adherence against an epoxy-acid crosslinked acid-rain resistant coating (DCT-5001, available from PPG Industries) at a ratio of 88 parts BA, 10 parts 3-(3-pyridinyl)propyl acrylate (PPA) and 2 parts AA. The results of this test can be found in Table 11.

Example 28

A foam tape sample was made and tested as in Example 27, except at a ratio of 78 parts BA, 20 parts PPA and 2 parts AA. The results of this test can be found in Table 10.

TABLE 11

| Ex. | Comp. | Amounts | 90° Peel, RT (N/dm) 24 hrs. |
|---|---|---|---|
| 27 | BA/PPA/AA/ABP | 88/10/2/0.08 | 364.3 (FS) |
| 28 | BA/PPA/AA/ABP | 78/20/2/0.08 | 371.3 (FS) |

Examples 25–28 illustrate the usefulness of strongly basic copolymerizable monomers having a basic nitrogen as a member of an aromatic ring system in the pressure-sensitive adhesives of the present invention. (These results additionally suggest that analogous free-radically copolymerizable basic monomers having similarly unhindered and basic aromatic nitrogens, such as vinyl pyridine, can also be useful in these applications.)

Reasonable variations and modifications of the foregoing specification are possible without departing from the scope of the invention which is defined in the accompanying claims.

The following is claimed:

1. A pressure-sensitive adhesive consisting essentially of:
    a crosslinked copolymer of 100 parts by weight of monomer of elements (a), (b), and (c) wherein the copolymer comprises
    (a) about 60 to about 90 parts by weight of at least one monomer selected from the group consisting of monofunctional unsaturated (meth)acrylate esters of non-tertiary alkyl alcohols, and mixtures thereof, the alkyl groups of which comprise from about 4 to about 12 carbon atoms which as homopolymers have glass transition temperatures below about −20° C.;
    (b) correspondingly, about 40 to about 10 parts by weight of a basic copolymerizable monomer having the formula

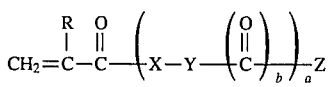
Formula (I)

wherein
a represents an integer of 0 to 1;
b represents an integer of 1;
R is selected from the group consisting of H— and CH$_3$—;
X is selected from the group consisting of —O— and —NH—;
Y is a divalent linking group comprising 1 to 5 carbon atoms;
Z is a non-sterically hindered group

wherein
R$^1$ is selected from the group consisting of an electron donating group and a radical which completes a ring structure including Y to form a heterocycle;
R$^2$ is Selected from the group consisting of an electron donating group and a radical which completes a ring structure including Y to form a heterocycle,
wherein R$^1$ and R$^2$ cannot simultaneously represent a radical which completes a ring structure including Y to form a heterocycle;
(c) about 0 to about 3 parts by weight an acidic monomer copolymerizable with the monomers of elements (a) and (b) wherein when the acidic monomer is included, the basic copolymerizable monomer should be present in a molar excess;
(d) about 0.05 to about 1 percent by weight of a crosslinking agent, based upon the total weight of (a) plus (b) plus (c); and
(e) optionally a material selected from the group consisting of fillers, pigments, woven fabrics, nonwoven fabrics, foaming agents, antioxidants, stabilizers, fire retardants, viscosity adjusting agents, and solvents;
wherein the pressure-sensitive adhesive has a basic character and wherein the pressure sensitive-adhesive has the ability to permanently bond to solid acidic surfaces.

2. The pressure-sensitive adhesive of claim 1 wherein the (meth)acrylate esters are selected from the group consisting of n-butyl acrylate, n-butyl methacrylate, isobutyl acrylate, 2-methyl butyl acrylate, 2-ethylhexyl acrylate, n-octyl acrylate, isooctyl acrylate, isooctyl methacrylate, isononyl acrylate, isodecyl acrylate, and mixtures thereof.

3. The pressure-sensitive adhesive of claim 1 wherein the (meth)acrylate esters are selected from the group consisting of isooctyl acrylate, n-butyl acrylate, 2-ethylhexyl acrylate, and mixtures thereof.

4. The pressure-sensitive adhesive of claim 1 wherein the moderately basic copolymerizable monomer is selected from the group consisting of N,N-dimethyl acrylamide, N,N-dimethyl methacrylamide, N,N-diethyl acrylamide, N,N-diethyl methacrylamide and mixtures thereof.

5. The pressure-sensitive adhesive of claim 1 wherein the acidic monomer is selected from the group consisting of ethylenically unsaturated carboxylic acids, ethylenically unsaturated sulfonic acids, ethylenically unsaturated phosphoric acids, and mixtures thereof.

6. The pressure-sensitive adhesive of claim 5 wherein the acidic monomer is selected from the group consisting of acrylic acid, methacrylic acid, itaconic acid, fumaric acid, crotonic acid, citraconic acid, maleic acid, beta-carboxyethyl acrylate, sulfoethyl methacrylate, and mixtures thereof.

7. The pressure-sensitive adhesive of claim 1 wherein the crosslinking agent is selected from the group consisting of multifunctional acrylates, substituted triazines, mono-ethylenically unsaturated aromatic ketones, mono-ethylenically unsaturated monoalkoxy silane compounds, dialkoxy silane compounds and trialkoxy silane compounds, and heat activated copolymerizable crosslinking agents.

8. A coated sheet material comprising a substrate having the pressure-sensitive adhesive of claim 1 coated thereon.

9. The coated sheet material of claim 8 wherein said substrate is selected from the group consisting of polyesters, polyvinylchloride, polypropylenes, polyurethanes, fluorinated ethylene-propylenes, polyacrylates, polyethylenes, neoprenes and silicones.

10. A double sided tape having the pressure-sensitive adhesive of claim 1 coated on at least one side.

11. A composite comprising a solid acidic surface coated with the adhesive of claim 1.

12. The composite of claim 1 wherein said solid acidic surface is selected from the group consisting of plastics, elastomers, and foams.

13. The composite of claim 11 wherein said solid acidic surface is polyvinylchloride.

14. The composite of claim 11 wherein said solid acidic surface is a paint coating.

15. The composite of claim 11 wherein said solid acidic surface is an automotive coating.

16. A composite comprising an article bonded to a solid acidic surface via the adhesive of claim 1.

17. The composite of claim 16 wherein said article is selected from the group consisting of emblems, moldings, decals, and films.

18. A pressure-sensitive adhesive consisting essentially of:
a crosslinked copolymer comprising 100 parts by weight of monomer of elements (a), (b), and (c) wherein the copolymer comprises
(a) about 60 to about 90 parts by weight of at least one monomer selected from the group consisting of monofunctional unsaturated (meth)acrylate esters of non-tertiary alkyl alcohols, and mixtures thereof, the alkyl groups of which comprise from about 4 to about 12 carbon atoms which as homopolymers have glass transition temperatures below about −20° C.;
(b) correspondingly, about 40 to about 10 parts by weight of a basic copolymerizable monomer having the formula

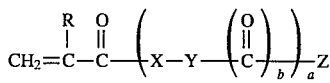
Formula (I)

wherein
a represents an integer of 0 to 1;
b represents an integer of 1;
R is selected from the group consisting of H— and CH$_3$—;
X is selected from the group consisting of —O— and —NH—;
Y is a divalent linking group comprising 1 to 5 carbon atoms;

Z is a non-sterically hindered group

wherein $R^1$ is selected from the group consisting of an electron donating group and a radical which completes a ring structure including Y to form a heterocycle;

$R^2$ is selected from the group consisting of an electron donating group and a radical which completes a ring structure including Y to form a heterocycle, wherein $R^1$ and $R^2$ cannot simultaneously represent a radical which completes a ring structure including Y to form a heterocycle;

(c) about 1 to about 3 parts by weight of an acidic monomer copolymerizable with the monomers of elements (a) and (b) wherein when the acidic monomer is included, the basic copolymerizable monomer should be present in a molar excess;

(d) about 1 to about 0.05 percent by weight of a crosslinking agent, based upon the total weight of (a) plus (b) plus (c); and (e) optionally a material selected from the group consisting of fillers, pigments, woven fabrics, nonwoven fabrics, foaming agents, antioxidants, stabilizers, fire retardants, viscosity adjusting agents, and solvents;

wherein the pressure-sensitive adhesive has a basic character and wherein the pressure sensitive-adhesive has the ability to permanently bond to solid acidic surfaces.

19. A composite comprising a solid acidic surface which is a paint coating coated with a pressure sensitive adhesive, the pressure sensitive adhesive consisting essentially of:

a crosslinked copolymer of 100 parts by weight of monomer of elements (a), (b), and (c) wherein the copolymer comprises (a) about 60 to about 90 parts by weight of at least one monomer selected from the group consisting of monofunctional unsaturated (meth)acrylate esters of nontertiary alkyl alcohols, and mixtures thereof, the alkyl groups of which comprise from about 4 to about 12 carbon atoms which as homopolymers have glass transition temperatures below about $-20°$ C.;

(b) correspondingly, about 40 to about 10 parts by weight era basic copolymerizable monomer having the formula

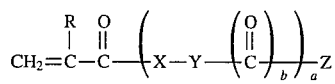

Formula (I)

wherein a represents an integer of 0 to 1;

b represents an integer of 1;

R is selected from the group consisting of H— and $CH_3$—;

X is selected from the group consisting of —O— and —NH—;

Y is a divalent linking group comprising 1 to 5 carbon atoms;

Z is a non-sterically hindered group

wherein $R^1$ is selected from the group consisting of an electron donating group and a radical which completes a ring structure including Y to form a heterocycle;

$R^2$ is selected from the group consisting of an electron donating group and a radical which completes a ring structure including Y to form a heterocycle, wherein $R^1$ and $R^2$ cannot simultaneously represent a radical which completes a ring structure including Y to form a heterocycle;

(c) about 0 to about 3 parts by weight an acidic monomer copolymerizable with the monomers of elements (a) and (b) wherein when the acidic monomer is included, the basic copolymerizable monomer should be present in a molar excess;

(d) about 0.05 to about 1 percent by weight of a crosslinking agent, based upon the total weight of (a) plus (b) plus (c); and (e) optionally a material selected from the group consisting of fillers, pigments, woven fabrics, nonwoven fabrics, foaming agents, antioxidants, stabilizers, fire retardants, viscosity adjusting agents, and solvents;

wherein the pressure-sensitive adhesive has a basic character and wherein the pressure sensitive-adhesive has the ability to permanently bond to solid acidic surfaces.

20. A composite comprising a solid acidic surface which is an automotive coating coated with a pressure sensitive adhesive, the pressure sensitive adhesive consisting essentially of:

a crosslinked copolymer of 100 parts by weight of monomer of elements (a), (b), and (c) wherein the copolymer comprises (a) about 60 to about 90 parts by weight of at least one monomer selected from the group consisting of monofunctional unsaturated (meth)acrylate esters of nontertiary alkyl alcohols, and mixtures thereof, the alkyl groups of which comprise from about 4 to about 12 carbon atoms which as homopolymers have glass transition temperatures below about $-20°$ C.;

(b) correspondingly, about 40 to about 10 parts by weight of a basic copolymerizable monomer having the formula

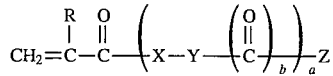

Formula (I)

wherein a represents an integer of 0 to 1;

b represents an integer of 0 to 1;

R is selected from the group consisting of H— and $CH_3$—;

X is selected from the group consisting of —O— and —NH—;

Y is a divalent linking group comprising 1 to 5 carbon atoms;

Z is a non-sterically hindered group

wherein
- $R^1$ is selected from the group consisting of —H, an electron donating group, and a radical which completes a ring structure including Y to form a heterocycle;
- $R^2$ is selected from the group consisting of —H, an electron donating group, and a radical which completes a ring structure including Y to form a heterocycle,
- wherein $R^1$ and $R^2$ cannot simultaneously represent a radical which completes a ring structure including Y to form a heterocycle;

(c) about 0 to about 3 parts by weight an acidic monomer copolymerizable with the monomers of elements (a) and (b) wherein when the acidic monomer is included, the basic copolymerizable monomer should be present in a molar excess;

(d) about 0.05 to about 1 percent by weight era crosslinking agent, based upon the total weight of (a) plus (b) plus (c); and (e) optionally a material selected from the group consisting of fillers, pigments, woven fabrics, nonwoven fabrics, foaming agents, antioxidants, stabilizers, fire retardants, viscosity adjusting agents, and solvents;

wherein the pressure-sensitive adhesive has a basic character and wherein the pressure sensitive-adhesive has the ability to permanently bond to solid acidic surfaces.

* * * * *

UNITED STATES PATENT AND TRADEMARK OFFICE
CERTIFICATE OF CORRECTION

PATENT NO.: 5,612,136

DATED: March 18, 1997

INVENTOR(S): Albert I. Everaerts, et al.

It is certified that error appears in the above-identified patent and that said Letters Patent is hereby corrected as shown below:

Column 25, line 24, "Selected" should read --selected--;

Column 26, line 24, "claim 1" should read --claim 11--; and

Column 27, line 51, "era" should read --of a--.

Signed and Sealed this

Third Day of August, 1999

Attest:

Q. TODD DICKINSON

*Attesting Officer*     *Acting Commissioner of Patents and Trademarks*